(12) United States Patent
Possamai

(10) Patent No.: US 9,314,873 B2
(45) Date of Patent: Apr. 19, 2016

(54) APPARATUS FOR LASER WORKING OF FLAT ELEMENTS

(75) Inventor: Domenico Possamai, Oderzo (IT)

(73) Assignee: ELECTRONICS AND COMPUTER HIGHLIGHTS, Machico, Madeira (PT)

(*) Notice: Subject to any disclaimer, the term of this patent is extended or adjusted under 35 U.S.C. 154(b) by 345 days.

(21) Appl. No.: 13/985,670

(22) PCT Filed: Feb. 21, 2012

(86) PCT No.: PCT/EP2012/052897
§ 371 (c)(1),
(2), (4) Date: Aug. 15, 2013

(87) PCT Pub. No.: WO2012/126688
PCT Pub. Date: Sep. 27, 2012

(65) Prior Publication Data
US 2013/0319986 A1   Dec. 5, 2013

(30) Foreign Application Priority Data

Mar. 21, 2011   (IT) .............................. PN2011A0017
Mar. 21, 2011   (PT) ......................................... 105576

(51) Int. Cl.
*B23K 26/08*   (2014.01)
*B23K 26/10*   (2006.01)
(Continued)

(52) U.S. Cl.
CPC ............... *B23K 26/10* (2013.01); *B23K 26/083* (2013.01); *B23K 26/0884* (2013.01); *B23K 26/364* (2015.10); *B23K 26/38* (2013.01);
(Continued)

(58) Field of Classification Search
CPC .. B23K 26/083; B23K 26/0884; B23K 16/10; B23K 26/367; B23K 26/38; B23K 26/381; B23K 26/4005; B23K 26/4045; B23K 26/4055; B23K 26/4065; B23K 26/4075; B23K 26/408; B23K 37/0235; B23K 2201/18
USPC .................................................. 409/200, 202
See application file for complete search history.

(56) References Cited

U.S. PATENT DOCUMENTS 4,650,952 A * 3/1987 Akeel ................ B23K 26/0884
219/121.74
5,053,602 A * 10/1991 Aharon .................. B23K 26/08
219/121.78

(Continued)

FOREIGN PATENT DOCUMENTS

EP   0187 934 A2   7/1986
FR   2 663 583 A1   12/1991

(Continued)

OTHER PUBLICATIONS

Jun. 26, 2012 Search Report issued in International Patent Application No. PCT/EP2012/052897.

(Continued)

*Primary Examiner* — Geoffrey S Evans
(74) *Attorney, Agent, or Firm* — Oliff PLC

(57) ABSTRACT

The present invention relates to an apparatus for laser working of flat or basically flat pieces or elements, such as plastic sheets, glass or ceramic sheets, metal plates, wooden panels or fabric slivers of various kinds. In particular, the invention relates to an apparatus provided with a simple structure suitable for supporting and moving a fiber laser head capable of reaching any point of a flat piece by a combined crosswise-rotating movement.

10 Claims, 3 Drawing Sheets

(51) Int. Cl.
  *B23K 26/38* (2014.01)
  *B23K 37/02* (2006.01)
  *B23K 26/40* (2014.01)

(52) U.S. Cl.
  CPC .............. *B23K 26/382* (2015.10); *B23K 26/40* (2013.01); *B23K 26/402* (2013.01); *B23K 37/0235* (2013.01); *B23K 2201/18* (2013.01); *B23K 2203/36* (2015.10); *B23K 2203/38* (2015.10); *B23K 2203/42* (2015.10); *B23K 2203/50* (2015.10); *B23K 2203/52* (2015.10)

(56) References Cited

U.S. PATENT DOCUMENTS

| | | | | |
|---|---|---|---|---|
| 2001/0008231 | A1* | 7/2001 | Britnell | B23K 26/032 219/121.63 |
| 2003/0192867 | A1 | 10/2003 | Yamazaki et al. | |
| 2005/0041697 | A1* | 2/2005 | Seifert | B23K 26/0096 372/6 |

FOREIGN PATENT DOCUMENTS

| | | | | |
|---|---|---|---|---|
| JP | 61-154786 | A | * | 7/1986 |
| JP | 63-101091 | A | * | 5/1988 |
| JP | 04-319090 | A | * | 11/1992 |
| JP | 06-008182 | A | * | 1/1994 |
| JP | 06-083416 | A | * | 3/1994 |
| JP | 6-124114 | A | * | 5/1994 |
| JP | 7-314167 | A | * | 12/1995 |
| JP | 11-221692 | A | * | 8/1999 |
| JP | 2005-62519 | A | * | 3/2005 |
| JP | 2009-078288 | A | * | 4/2009 |

OTHER PUBLICATIONS

Jun. 26, 2012 Written Opinion issued in International Patent Application No. PCT/EP2012/052897.

* cited by examiner

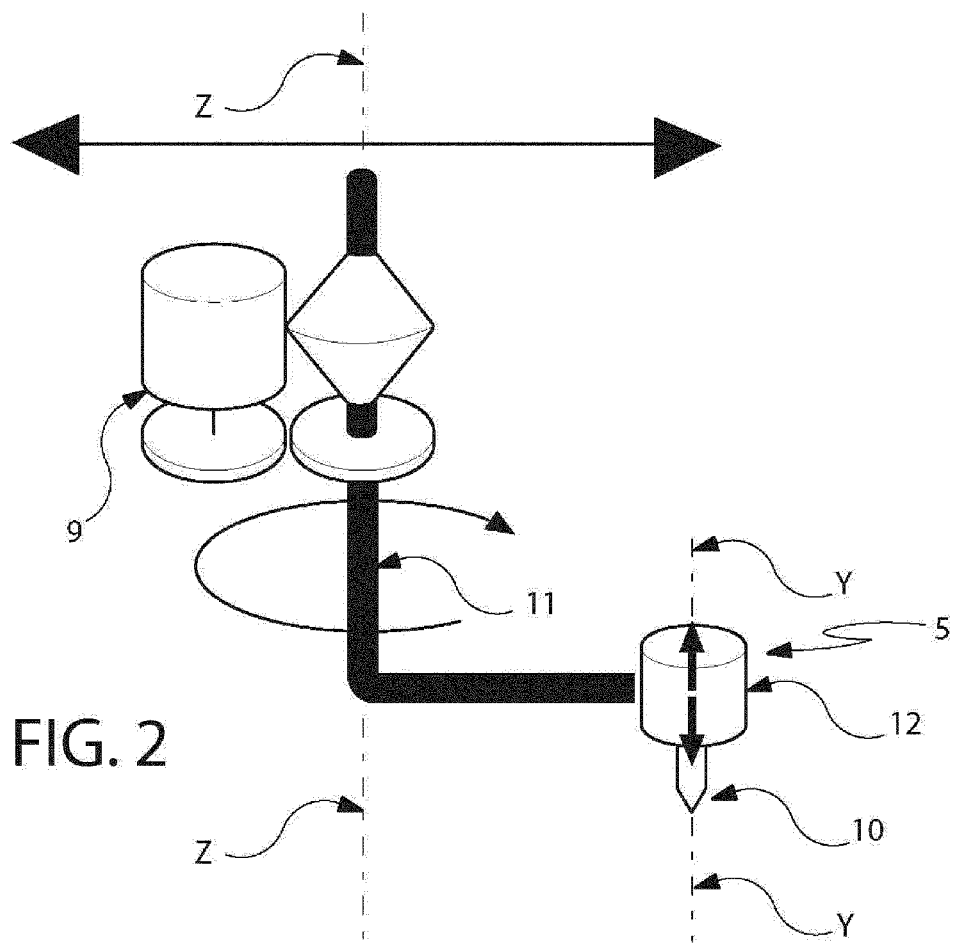
FIG. 2
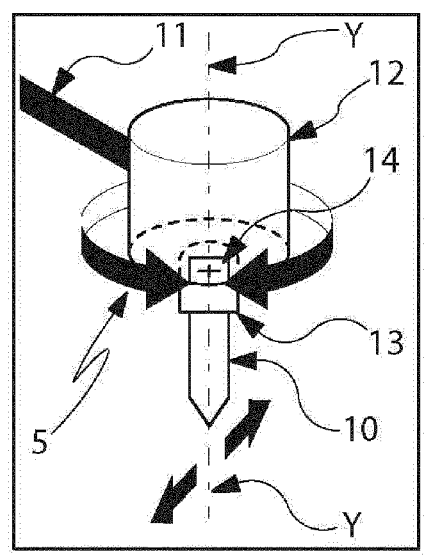
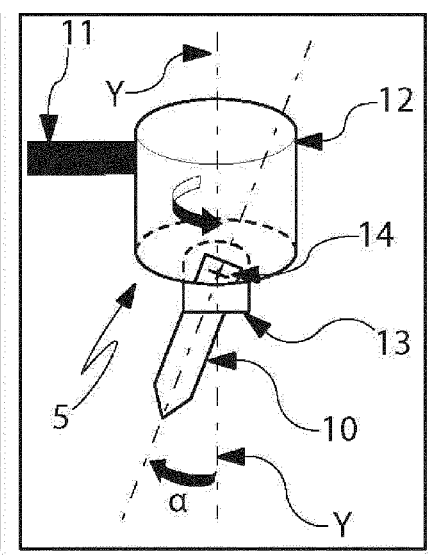
FIG. 3A  FIG. 3B

APPARATUS FOR LASER WORKING OF FLAT ELEMENTS

FIELD OF THE INVENTION

The present invention relates to an apparatus for laser working of flat or basically flat pieces or elements, such as plastic sheets, glass or ceramic sheets, metal plates, wooden panels or fabric slivers of various kinds. In particular, the invention relates to an apparatus provided with a simple structure suitable for supporting and moving a fiber laser head capable of reaching any point of a flat element to be worked.

BACKGROUND OF THE ART

Present day technology for laser working flat elements is based on rather complex apparatuses. In fact, such apparatuses generally comprise laser head moving systems provided with robotized arms or variously articulated parts to allow the laser head movement so that it can reach any point of an element to be worked. These systems are needed to allow working on the entire element. In other words in order to work any element or a substratum in each of its parts it is necessary to move the laser head by means of complex and bulky structures often moving also the plane whereon the element is supported. In particular, the laser head is provided with a pantograph-type system as it is more handy to move the head rather than the supporting plane, as the latter can be of rather big dimensions. Furthermore, the laser head must always be positioned perpendicularly to the surface to be worked and at a distance which varies according to the element to be worked, its thickness and the power of the laser used.

Anyway, as already said, the pantograph is a structure requiring a complex articulation of various parts which move along the three conventional Cartesian axes X-Y-Z. Accordingly, the robotized arms are to be equipped with many articulated joins and motors to allow the head laser tridimensional movement.

Consequently, then, such complexity requires many precision calibrations to ensure the apparatus proper working.

SUMMARY OF THE INVENTION

The technical objective at the basis of the present invention is therefore that of providing an apparatus for laser working of flat or basically flat elements capable of reaching any point of said flat elements by means of a compact moving structure of simple construction and requiring few calibrations.

Said objective is solved by an apparatus comprising a laser head moved by a combined crosswise-rotating system, as defined in the appended claims.

BRIEF DESCRIPTION OF DRAWINGS

Further characteristics and advantages of the apparatus of the present invention will become more apparent from the following description of a type of embodiment provided for illustration only and not for the purpose of limiting the invention with reference to the following figures wherein:

FIG. 2 shows a schematic view of the movement of a laser head of the apparatus in FIG. 1;

FIGS. 3A and 3B show a schematic and enlarged side view of the movement of the laser head in FIG. 2 in two different usage conditions;

DETAILED DESCRIPTION OF THE INVENTION

Figure 1:
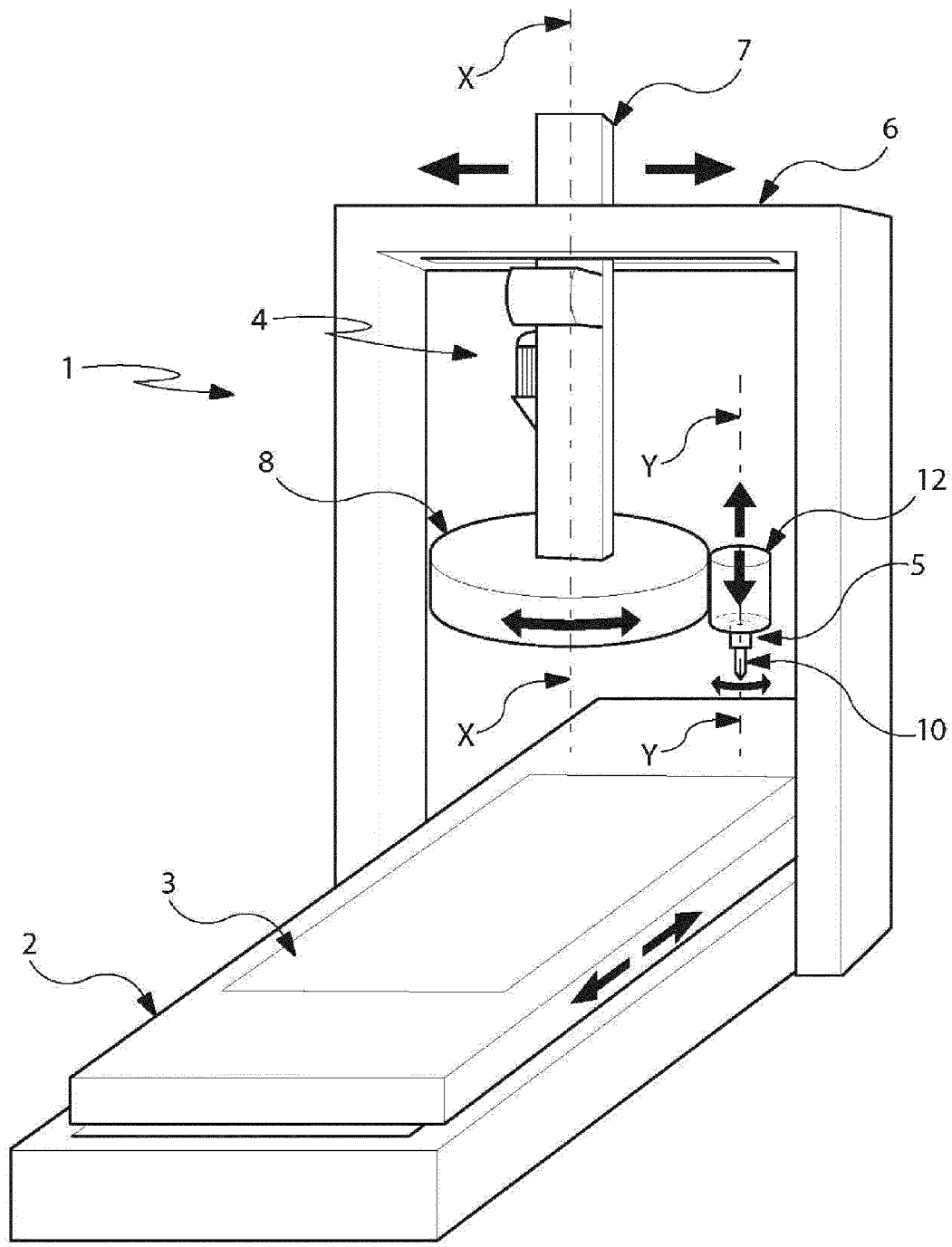
FIG. 1 shows a schematic axonometric view of an apparatus according to the invention.

As schematically shown in FIG. 1, the apparatus 1, in accordance with the present invention comprises a supporting plane 2 whereon an element 3 or substratum to be worked is put and a moving structure 4 of a laser head 5. The moving structure 4 of the laser head 5 is suspended upon the supporting plane 2 by means of a supporting structure 6.

In particular, the moving structure 4 of the laser head 5 comprises an arm 7 anchored to the supporting structure 6 and connected with moving means (not shown, quite completely conventional) capable to move the arm along a crosswise direction with respect to the longitudinal extension of the supporting plane 2.

The end of arm 7 opposite with respect to the supporting structure 6 is provided with rotating means such as a rotating disk 8 (as schematically shown in FIG. 1) comprising an external rotating portion whose external circumference carries the laser head 5 which is rotated around an axis X-X of said motor. In particular, such rotating disk can be formed by a "brushless" motor with an internal stator and an external rotor whose periphery carries the laser head 5.

The laser head 5, as schematically shown in FIG. 1, comprises a tip 10 directed towards the supporting plane 2 so that it directs the laser beam coming out from the head along an axis Y-Y parallel to the rotating axis X-X of the rotating means and spaced from these.

It is to notice that such positioning, as it will later be better disclosed, allows the laser head to advantageously move around the rotating axis X-X of the rotating means to ideally draw a circumference lying onto a plane parallel to the supporting plane 2.

Moreover, the combination with the above said crosswise movement of arm 7 allows moving in any point of the element to be worked through only the two mentioned movements, i.e. one crosswise and the other one rotating, the first one directly carried out on practically single-pieced arm and the second one carried out directly on the laser head. In other words, through only these two movements and the relative two components that is an arm formed by a single piece and a rotating motor, it is possible to reach every part to be worked which otherwise can only be reached by means of the prior art complex structures described above.

Alternatively, the rotating disk 8 can be represented by a rotating shaft 11, shown in FIG. 2, having an L-shape and rotatably connected with arm 7. The rotating shaft 11 too is a single piece rotatably moved around an axis Z-Z perpendicular with respect to the supporting plane 2 by a conventional motor 9. In particular, the free end of the shaft 11, opposite to arm 7, carries the laser head 5. Like the rotating disk 8, also the rotating shaft 11 allows the laser head to move around the rotating axis Z-Z so that it can ideally draw a circumference lying onto a plane parallel to said supporting plane 2.

Preferably, the laser head 5 is mounted onto said rotating means 8, 11 so that it can rotate onto the exit axis Y-Y of the laser beam (FIG. 3A). In particular, the laser head 5 can in turn be provided with a motor 12 capable to rotate the tip 10 onto the axis Y-Y. For instance, the laser tip 10 can be provided with a rotating shaft 13 connected to said motor so that it can rotatably be moved onto said axis Y-Y.

Advantageously, moreover, the tip 10 can be connected to the rotating shaft 13 through a join 14 which allows the tip to move along an arc of a circle or, in other words, to incline with respect to the axis Y-Y. In FIG. 3B, it is shown an example of working position wherein the tip 10 has been rotated anti-clockwise onto the axis Y-Y and inclined of an angle α with respect to said axis.

Similarly, if the laser head 5 is mounted on the external circumference of a rotating disk 8 motor, as the one previously described, the tip 10 will be able to rotate onto its own axis Y-Y and, in addition, to incline of a selected angle relatively to said axis.

Furthermore, the laser head 5 can be moved along its axis Y-Y through a further conventional operation, not shown, for trim regulations of its distance relative to the substratum to be worked based on its material and thickness, as well as on the power of the laser used for the working.

It must be taken into account that, according to the present invention, the laser used is a fiber-type laser. In fact, it has been seen that the use of this kind of laser allows to advantageously simplify the apparatus structure greatly. For such a purpose, the laser head 5 can be reached from the outside by a conventional fiber cable designated to transmit the laser beam coming from a generator, for example, mounted on the supporting structure 6 but, anyhow, not actually belonging to the apparatus itself.

As the apparatus is greatly versatile, any type of fiber laser known in the field can be used, obviously, according to the kind of material to be worked and its thickness. Preferably, it can be used a last generation laser characterized by a direct exciting system of the active ytterbium (Yb) doped fiber, through pumped-light laser diodes (LD).

The apparatus according to the present invention is further implemented with an actuation and control unit (not shown) such as a computer capable of operating the movements of the entire moving structure based on predetermined programs uploaded on said unit.

Once set up some standard working parameters such as the type of material and its thickness, the laser head 5 can be equipped with a scanner beam capable of scanning the surface to be worked and of detecting the suitable values indicative of said surface characteristics. These values are then processed by the program in combination with the kind of working to be done either a cut or a superficial marking. At this point, the computer will actuate the entire apparatus in order to operate the desired working correctly.

Preferably, moreover, the supporting plane 2, can be moved back and forth along a single longitudinal direction to allow not only the positioning of the element 3 to be worked near the laser head 5, but also in combination with the movement of the laser head itself while working in order to make it easy to reach the farthest point of the element and in order to facilitate carrying out of particularly complex working according to difficult paths.

Figure 4A:
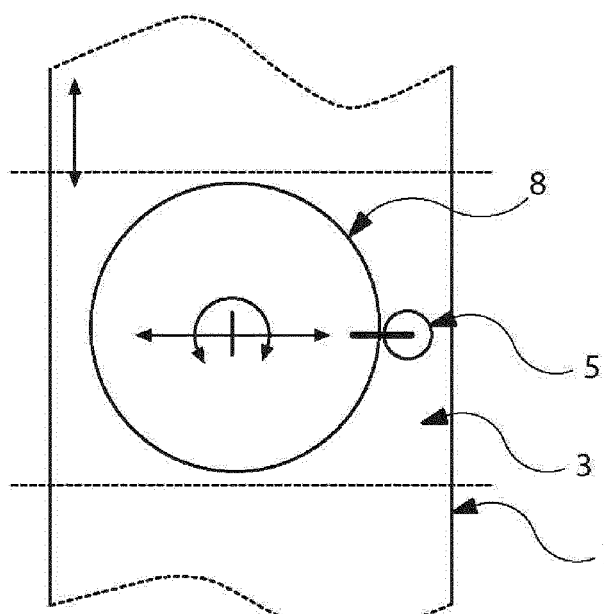
FIGS. 4A, 4B and 4C each shows a schematic top view of the movement of the laser head in FIG. 1 in three different usage conditions.

As schematically shown in FIG. 4A, the rotating means 8, 11, for example, are positioned basically at the center of the flat element 3 to be worked. In this position the laser head 5 can move along the circumference described by the rotation of said rotating means and, therefore, to perform working, such as superficial engravings, holes or cuts along a wide path through a simple rotating movement.

Figure 4C:
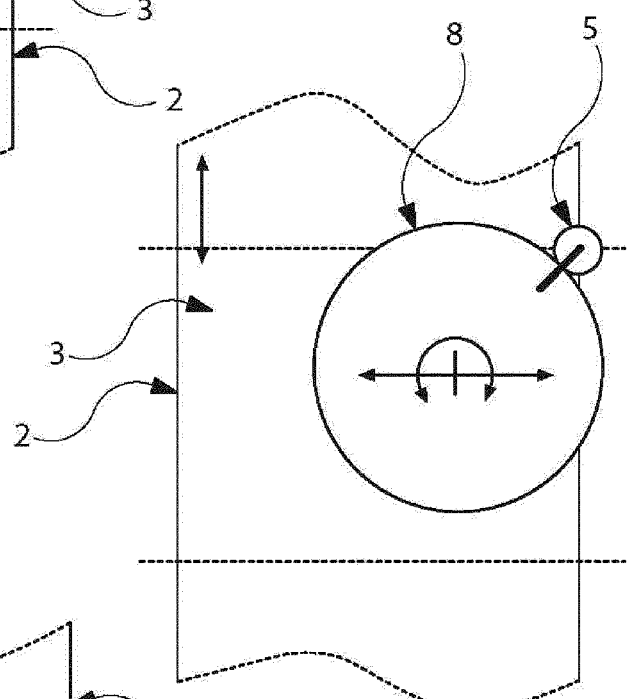
Figure 4B:
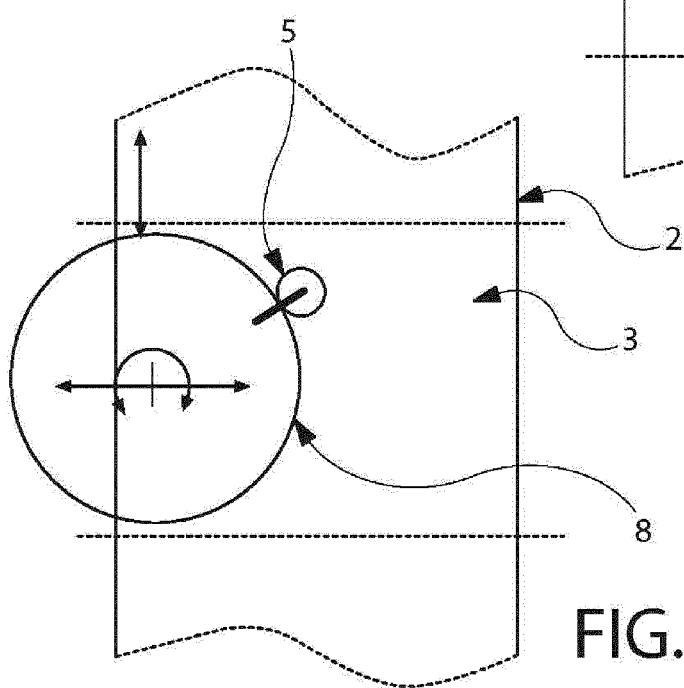

In addition, the rotating means 8, 11 can be moved in sequence or in combination with the rotation, along the crosswise direction with respect to the supporting plane 2 so that the laser head 5 can reach any point of the central portion of flat element 2 (FIG. 4B).

Preferably, the supporting plane 2 can be moved further as in the foregoing description to allow the laser head 5 to reach even the farthest points of flat element 2 periphery and therefore have the possibility to treat every part of the element itself (FIG. 4C) thus making complex working through the combination of a rotating movement and a crosswise one.

In accordance with a particularly preferred embodiment, the apparatus of the invention can be provided with detection sensors (not shown) or with a camera capable of detecting the positioning of the element to be worked on the supporting plane. For example, quite conventional optical sensors, such as photocells, can be positioned along the supporting plane 2 on both its longitudinal sides in order to detect the position of one or more elements to be worked while the plane is operated non-stop. This situation occurs in the case of a conveyor belt whereon various elements to be worked are loaded and come from a preceding work station and which thus can be worked non-stop. In fact, the detection system allows to detect the piece in proximity of the laser head 5 and to activate through the said activation and control unit, the laser beam activation any time an element is exactly under said laser head. It is apparent that the apparatus can thus work non-stop and can be integrated in a production line with several work stations. Alternatively, a camera can, for example, be mounted on the supporting structure 6 in order to record the transit of the elements to be worked near the laser head 5. The recording of said transit is sent to said activation and control unit which in turn, as previously, activates the laser beam of the laser head 5. Besides, the camera can control the working state in order to verify the correct execution of the laser treatment and block or correct the operation parameters such as the laser head movement and/or its power and/or its inclination always allowing the optimization of the final result.

From what disclosed it is apparent that the apparatus for laser working of flat elements according to the present invention is very simple from the construction point of view and not so bulky in comparison with the apparatuses and systems of prior art.

In particular, the moving structure is slender, not heavy and it doesn't need particular adjustments or calibrations as the moving means are formed by few mechanically simple elements.

This advantageously allows to be able to associate the apparatus after of before other apparatuses or systems forming a complete production line. For instance, apparatuses for drawing, threading or other operating apparatuses can be associated to the apparatus of the invention in order to form an outright production line.

The optimum working range is the same as the diameter of the laser head rotation and moreover, in this range the moving parts are limited allowing a high working speed. Anyway, it must be taken into account that the working range can be modified, enlarged implementing the possibility of moving the substratum onto the supporting plane.

Further, the capability of the laser head to incline and rotate with respect to the axis Y-Y at right angle to the plane 2 allows special working onto surfaces such as corrugated ones, always keeping the laser beam at right angle to the surface itself.

The apparatus assembly is simple and doesn't require complex solutions as mechanisms such as pantographs or robotized arms are avoided. In particular, it must be noticed that the rotating means can have dimensions less than one meter and can be connected to the supporting arm 7 in a conventional way without particular adjustments. For instance, the supporting arm 7 itself can be the stator of the rotating disk motor 8 and the laser head 5 can be mounted onto the rotating portion of said motor through a pin or an articulated join which allows said rotating and oscillatory movements.

In addition, the use of an optical fiber laser doesn't need mirrors usually used to direct the laser beam as in the conventional lasers. In fact, it is known that the calibrations required in order to position such mirrors correctly are particularly demanding.

The laser generator, being a fiber one, can be easily changed for typology modifications as it is a separate piece of equipment of the invention and mounted onto it in a simple way.

Further modifications of the apparatus of the present invention are possible for a person skilled in the art without departing from the safeguarding field of the invention as defined in the appended claims.

The invention claimed is:

1. Apparatus for laser working of structural elements comprising:
   a flat and longitudinal supporting plane for the elements;
   a moving structure of a laser head suspended upon the supporting plane by an arm; and
   a rotator provided with a rotating axis perpendicular to the flat and longitudinal supporting plane are fixed at the end of the arm opposite to the structure to rotate the laser head around the rotating axis,
   wherein the rotator comprises a rotating disk provided with a rotating external portion whose external circumference carries the laser head, the laser head being rotatable around the rotating axis of the rotator.

2. Apparatus according to claim 1, wherein the arm is moved crosswise to the supporting plane to allow the laser head also to move crosswise alternately or in combination with the rotating movement around the axis of the rotator of the laser head with respect to an element to be worked.

3. Apparatus according to claim 1, wherein the arm is a single piece extending perpendicular upon the supporting plane and is directly connected with a first end to a supporting structure and with a second end to the rotator.

4. Apparatus according to claim 1, wherein the laser head comprises a tip directed towards the flat and longitudinal supporting plane to direct the laser beam coming out from the laser head along an axis parallel to and spaced from the rotating axis of the rotator.

5. Apparatus according to claim 1, wherein the rotating disk is a motor with an internal stator and an external rotor whose periphery carries the laser head.

6. Apparatus according to claim 1, wherein the laser head is mounted onto the rotator to rotate onto the exit axis of the laser beam.

7. Apparatus according to claim 6, wherein the laser head is mounted onto the rotator to rotate onto the exit axis of the laser beam by a motor adapted to rotate a tip of the laser head onto the axis through a rotating shaft.

8. Apparatus according to claim 7, wherein the tip is connected to the rotating shaft through a joint which allows the movement of the tip along an arc of a circle.

9. Apparatus according to claim 1, wherein the laser head is a fiber laser head, which fiber is active and ytterbium doped, through pumped-light laser diodes.

10. Apparatus according to claim 9, wherein the fiber laser head is characterized by a direct exciting system of fiber.

* * * * *